United States Patent
de Aguiar et al.

(10) Patent No.: US 9,704,288 B2
(45) Date of Patent: Jul. 11, 2017

(54) STABLE SPACES FOR RENDERING CHARACTER GARMENTS IN REAL-TIME

(75) Inventors: Edilson de Aguiar, Pittsburgh, PA (US); Leonid Sigal, Pittsburgh, PA (US); Adrien Treuille, Pittsburgh, PA (US); Jessica K. Hodgins, Pittsburgh, PA (US)

(73) Assignee: Disney Enterprises, Inc., Burbank, CA (US)

(*) Notice: Subject to any disclaimer, the term of this patent is extended or adjusted under 35 U.S.C. 154(b) by 1308 days.

(21) Appl. No.: 12/974,293

(22) Filed: Dec. 21, 2010

(65) Prior Publication Data
US 2011/0273457 A1 Nov. 10, 2011

Related U.S. Application Data

(60) Provisional application No. 61/331,363, filed on May 4, 2010.

(51) Int. Cl.
*G06T 17/00* (2006.01)
*G06T 13/20* (2011.01)

(52) U.S. Cl.
CPC .............. *G06T 17/00* (2013.01); *G06T 13/20* (2013.01); *G06T 2210/16* (2013.01)

(58) Field of Classification Search
USPC ........................................ 345/474
See application file for complete search history.

(56) References Cited

U.S. PATENT DOCUMENTS

2008/0180448 A1* 7/2008 Anguelov et al. ............ 345/475

OTHER PUBLICATIONS

Cordier et al, "A Data-driven Approach for Real-Time Clothes Simulation." Proc. 12th Pacific Conference on Computer Graphics and Applications, Seoul, Korea., IEEE Publisher, pp. 257-266, Oct. 2004.*
James et al, "Precomputing interactive dynamic deformable scenes" ACM Trans. Graph. 22, 3 (Jul. 2003), 879-887.*
Welch et al, "An introduction to the kalman filter" University of North Carolina at Chapel Hill, Chapel Hill, NC, 1997.*
Oh et al, "Semantics over Geometry: Garmented Body Model Generation for Real-time Simulation," Workshop towards Semantic Virtual Environments (SVE 2005), Mar. 2005.*

(Continued)

*Primary Examiner* — Barry Drennan
*Assistant Examiner* — Schiller Hill
(74) *Attorney, Agent, or Firm* — Patterson + Sheridan, LLP

(57) ABSTRACT

Techniques are disclosed for providing a learning-based clothing model that enables the simultaneous animation of multiple detailed garments in real-time. A simple conditional model learns and preserves key dynamic properties of cloth motions and folding details. Such a conditional model may be generated for each garment worn by a given character. Once generated, the conditional model may be used to determine complex body/cloth interactions in order to render the character and garment from frame-to-frame. The clothing model may be used for a variety of garments worn by male and female human characters (as well as non-human characters) while performing a varied set of motions typically used in video games (e.g., walking, running, jumping, turning, etc.).

24 Claims, 7 Drawing Sheets

(56) References Cited

OTHER PUBLICATIONS

An, S., Kim, T., and James, D. 2008. Optimizing cubature for efficient integration of subspace deformations. ACM Transactions on Graphics 27, 5.
Baraff, D., and Witkin, A. P. 1998. Large steps in cloth simulation. ACM Transactions on Graphics, 43-54.
Baraff, D., Witkin, A., and Kass, M. 2003. Untangling cloth. ACM Transactions on Graphics 22, 3, 862-870.
Barbic, J., and James, D. L 2005. Real-time subspace integration for st. venant-kirchhoff deformable models. ACM Transactions on Graphics 24, 3, 982-990.
Bridson, R., Marino, S., and Fedkiw, R. 2003. Simulation of clothing with folds and wrinkles. In ACM/Eurographics Symposium on Computer Animation, 28-36.
Wordier, F., and Magnenat-Thalmann, N. 2005. A data driven approach for real-time clothes simulation. In Pacific Conference on Computer Graphics and Applications, vol. 24, 257-266.
Wordier, F., and Thalmann, N. M. 2002. Real-time animation of dressed virtual humans. In Computer Graphics Forum, vol. 21, 327-335.
English, E., and Bridson, R. 2008. Animating developable surfaces using nonconforming elements. ACM Transactions on Graphics 27, 3, 66:1-66:5.
Shahramani, Z., and Hinton, G. E 1996. Parameter estimation for linear dynamical systems. Tech. Rep. CRG-TR-96-2.
Soldenthal, R., Harmon, D., Fattal, R., Bercovier, M., and Grinspun, E 2007. Efficient simulation of Inextensible cloth. ACM Transactions on Graphics 26, 3, 49.
Grinspun, E., Hirani, A. N., Desbrun, M., and Schr'C Der, P. 2003. Discrete shells. In 2003 ACM SIGGRAPH / Eurographics Symposium on Computer Animation, 62-67.
Harmon, D., Vouga, E., Smith, B., Tamstorf, R., and Grinspun, E. 2009. Asynchronous contact mechanics. ACM Transactions on Graphics 28, 3.
Hinton, G., and Roweis, S. 2002. Stochastic neighbor embedding. In Advances in Neural Information Processing Systems, vol. 15, 833-840.
Hotelling, H. 1933. Analysis of a complex of statistical variables into principal components. Journal of Educational Psychology 24, 417-441.
James, D. L., and Fatahalian, K. 2003. Precomputing interactive dynamic deformable scenes. vol. 22, 879-887.
James, D. L., and Twigg, C. D. 2005. Skinning mesh animations. ACM Transactions on Graphics 24, 3, 399-407.
Kalman, R. 1960. A new approach to linear filtering and prediction problems. Transactions of the ASME-Journal of Basic Engineering 82, Series D, 35-45.
Kang, Y.-M., and Cho, H.-G. 2002. Bilayered approximate integration for rapid and plausible animation of virtual cloth with realistic wrinkles. In Computer Animation, 2002. Proceedings of, 203-211.
Kang, Y.-M., Choi, J.-H., Cho, H.-G., and Lee, D.-1-1. 2001. An efficient animation of wrinkled cloth with approximate implicit integration. The Visual Computer 17, 3, 147-157.
Kavan, L, Sloan, P.-P., and O'Sullivan, C. 2010. Fast and efficient skinning of animated meshes. Computer Graphics Forum 29, 2.
Kim, T -Y., and Vendrovsky, E. 2008. Drivenshape—a data driven approach for shape deformation. In ACM SIGGRAPH / Eurographics Symposium on Computer Animation.
Kry, P. G., James, D. L, and Pai, D. K 2002. Eigenskin: real time large deformation character skinning in hardware. In ACM SIGGRAPH / Eurographics Symposium on Computer Animation, 153-159.
Lacy, S., and Bernstein, D. 2003. Subspace identification with guaranteed stability using constrained optimization. Automatic Control, IEEE Transactions on 48, 7, 1259-1263.
Larboulette, C., Cani, M.-P., and Arnaldi, B. 2005. Dynamic skinning: Adding real-time dynamic effects to an existing character animation. In Spring Conference on Computer Graphics (SCCG).
Lawrence, N. 2005. Probabilistic non-linear principal component analysis with gaussian process latent variable models. Journal of Machine Learning Research 6, 1783-1816.
Ljung, L. 1986. System identification: theory for the user. Prentice-Hall, Inc., Upper Saddle River, NJ, USA.
Nguyen, H., and Donnelly, W. 2005. Hair animation and rendering in the nalu demo. In GPU Gems 2: Programming Techniques for High-Performance Graphics and General-Purpose Computation (Gpu Gems), M. Pharr and R. Fernando, Eds. Addison-Wesley Professional, ch. 23.
Roweis, S. T., and Saul, L. K. 2000. Nonlinear dimensionality reduction by locally linear embedding. Science, 5500, 2323-2326.
Rudomin, I., and Castillo, J. L 2002. Real-time clothing: Geometry and physics. WSCG 2002 Posters, 45-48.
Belle, A., Su, J., Irving, G., and Fedkiw, R. 2009. Robust high-resolution cloth using parallelism, history-based collisions, and accurate friction. IEEE Transactions on Visualization and Computer Graphics 15, 2, 339-350.
Shi, X. Zhou, K., Tong, Y., Desbrun, M., Bao, H., and Guo, B. 2008. Example-based dynamic skinning in real time.ACM Transactions on Graphics 27, 3, 1-8.
Siddiqi, S., Boots, B., and Gordon, G. 2007. A constraint generation approach to learning stable linear lynamical systems. In Advances in Neural Information Processing Systems.
Stam, J. 2009. Nucleus: Towards a unified dynamics solver for computer graphics. In IEEE International Conference on Computer-Aided Design and Computer Graphics, 1-11.
Tenenbaum, J., De Silva, V., and Langford, J. 2000. A global geometric framework for nonlinear limensionality reduction. Science 290, 5500, 2319-2323.
Treuille, A., Lewis, A., and Popovi'C , Z. 2006. Model reduction for real-time fluids. ACM Transactions on Graphics 25, 826-834.
Van Gestel, T., Suykens, J., Van Dooren, P., and De Moor, B. 2001. Identification of stable models in subspace identification by using regularization. IEEE Transactions on Automatic Control 46, 9, 1416-1420.
Van Overschee, P., and De Moor, B. L. R. 1996. Subspace identification for linear systems: theory, implementation, applications. Springer.
Vassilev, T., Spanlang, B., and Chrysanthou, Y. 2001. Fast cloth animation on walking avatars. Computer Graphics Forum 20, 3, 260-267.
Viberg, M. 1995. Subspace-based methods for the identification of linear time-invariant systems. Automatica 31, 12, 1835-1851.
Edilson de Aguiar, Leonid Sigal, Adrien Treuille, Jessica K Hodgins "Stable Spaces for Real-time Clothing" In Transactions on Graphics (SIGGRAPH'10), Jul. 2010.

* cited by examiner

STABLE SPACES FOR RENDERING CHARACTER GARMENTS IN REAL-TIME

CROSS-REFERENCE TO RELATED APPLICATION

This application claims benefit of U.S. Provisional Patent Application Ser. No. 61/331,363, filed May 4, 2010, which is incorporated herein by reference.

BACKGROUND

Field of the Invention

Embodiments of the present invention relate to the field of computer graphics and, in particular, to a learning-based clothing model used to animate detailed character garments (or other fabrics) in real time.

Description of the Related Art

In a computer gaming environment, generating images from a set of world and object geometry can be a complex task. A game engine needs to determine interactions between elements of geometry, compute physics for objects in the environment, respond to user input, compute actions for non-player characters, determine what elements are visible, among other things, all while rendering images at an acceptable frame-rate. This complexity makes it very difficult to render certain visual elements in a scene, such as clothing, water, hair, and smoke with a realistic appearance. In particular, rendering clothing or garments on a human (or non-human) character in order to drape the moving character has proven to be difficult.

Clothing simulation techniques can produce stunningly realistic examples of detailed folding and rich knit textures. However, these approaches typically require high resolution meshes to represent fine detail, complex time-stepping methods to avoid instability, as well as expensive nonlinear solvers to resolve collisions. Therefore, real-time applications, such as animation prototyping, training simulations and computer games, are unable to use these approaches, as they cannot generate results in real time.

Instead, video games (and other real-time rendering applications) typically rely on fast, low-dimensional, coarse models or tight-skinning models that render garments in a fixed space relative to character pose and position. It would be useful to combine the benefits of low-dimensional representations, which can be rendered in real-time, with the expressive power of detailed high resolution cloth models. Interactive applications also require stability over long time-steps while maintaining collision constraints.

SUMMARY

Embodiments of the invention provide a learning-based cloth model used to render a garment on a body at a frame rate acceptable for real-time applications such as video games or other interactive simulations. One embodiment of the invention includes a method for generating a cloth behavior model. This method may generally include generating a first low-dimensional representation. The first low-dimensional representation models a cloth in contact with the object. This method may further include generating a second low-dimensional representation. The second low-dimensional representation models the cloth in contact with the object in a linear cloth space. This method may still further include generating, as the cloth behavior model, a dynamical model of the cloth in the linear cloth space and storing the resulting cloth behavior model for use in animating the cloth in contact with the object.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Figure 1:
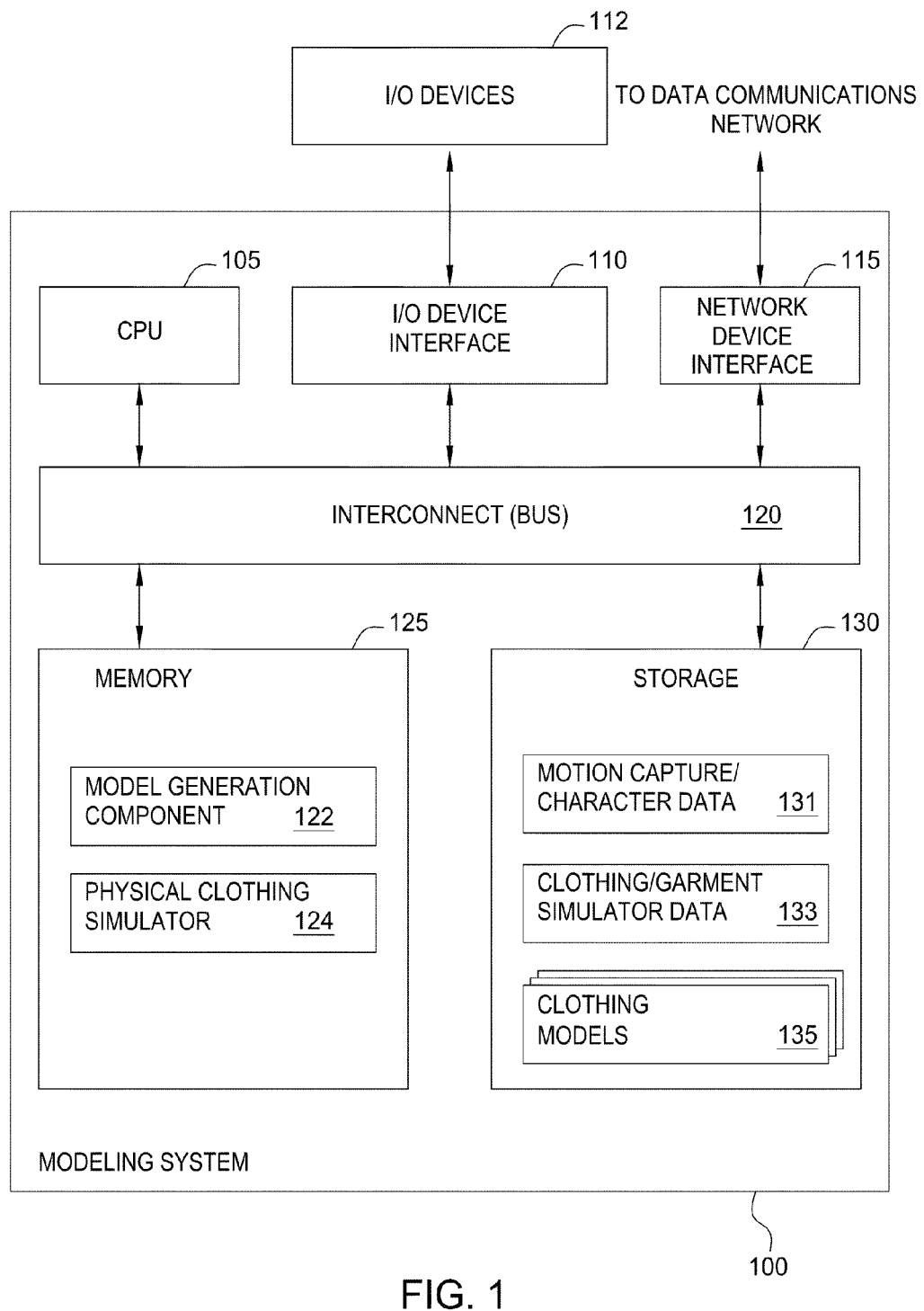
FIG. 1 is a block diagram of a computing system configured to generate a learning-based cloth model, according to one embodiment of the invention.

Embodiments of the invention provide a learning-based clothing model that enables the simultaneous animation of multiple detailed garments in real-time. In one embodiment, a simple conditional model learns and preserves key dynamic properties of cloth motions and folding details. Such a conditional model may be generated for each garment worn by a given character. Once generated, the conditional model may be used to determine complex body/cloth interactions in order to render the character and garment from frame-to-frame. For example, consider a female character wearing a dress. As this character runs, the dress swings back and forth in response. When this character stops running, the dress swings forward before coming back to a resting state. The clothing model described below may be used to represent these sorts of complex, dynamical cloth/body interactions.

The learning-based clothing model described herein does not require a physical model physical model, but instead may use a set of training data as a "black box." Further, the clothing model learned using the techniques disclosed herein are stable over large time-steps and can approximately resolve cloth-body collisions. More generally, the clothing model bridges the gap between a simple skinning model that does not account for the dynamical aspects of garment/character interaction and physical simulation, providing the benefits of speed from the former with the dynamic visual effects from the latter. The clothing model may be used for a variety of garments worn by male and female human characters (as well as non-human characters) while performing a varied set of motions typically used in video games (e.g., walking, running, jumping, turning, etc.).

The clothing model described below utilizes two basic properties of interactive spaces. First, digital characters typically exist in low-dimensional, sometimes finite, configuration spaces such as linear skinning models or motion graphs. That is, the available range of motions (and combinations of motions) for a video game character may be limited to a discrete set of movements (and combinations of movements) as well as motions similar to those that were used to train the model. This property allows the output of complex simulations to be distilled into compact linear models of character pose and clothing. Second, clothing collisions are dominated by body-cloth contact, not self-collisions, particularly for dynamic motions. This property allows a simple conditional model of the clothing configuration to be built that preserves folding details.

The conditional dynamical model provides an efficient means of estimating the latent state of the cloth over time, based on the current latent state of the body, the history of past cloth states, and meta-parameters encoding the character's root motion in space. The resulting model is stable as well as capable of generalizing across different motions and temporal executions, distinct from the original training set. This approach avoids overfitting and unwarranted (in terms of performance) complexity that often results from direct physical simulation techniques. Accordingly, embodiments of the invention provide a learning-based approach to model the dynamic behavior of clothing. The conditional linear model is efficient, yet provides a realistic and detailed clothing behaviors including folding and dynamic motion.

System Overview

FIG. 1 is a block diagram of a computing system 100 configured to generate a learning-based clothing model, according to one embodiment of the invention. As shown, the computing system 100 includes, without limitation, a central processing unit (CPU) 105, a network interface 115, an interconnect 220, a memory 125, and storage 130. The computing system 100 may also include an I/O device interface 110 connecting I/O devices 112 (e.g., a keyboard, display and mouse devices) to the computing system 100.

As is known, a CPU 105 is generally configured to retrieve and execute programming instructions stored in the memory 125. Similarly, the CPU 105 directs the movement of application data and instructions between the memory 125 and the storage 130. The interconnect 120 is used to transmit programming instructions and application data between the CPU 105, I/O devices interface 110, storage 130, network interface 115, and memory 125. Note, the CPU 105 is included to be representative of a single CPU, multiple CPUs, a single CPU having multiple processing cores, and the like. Further, system 100 may also include a separate graphics subsystem with a graphics processing unit (GPU). And the memory 125 is generally included to be representative of a random access memory. Storage 130, such as a hard disk drive or flash memory storage drive, may store non-volatile data. Although shown as a single unit, the storage 130 may be a combination of fixed and/or removable storage devices, such as fixed disc drives, floppy disc drives, tape drives, removable memory cards, optical storage, network attached storage (NAS), or a storage area-network (SAN). Illustratively, the memory 125 includes a model generation component 122 and a physical clothing simulator 124, and the storage 130 includes motion capture/character data 131, cloth/garment simulation data 133 and clothing models 135.

The model generation component 122 provides a software component used to generate a conditional linear model of clothing worn by a character. That is, the model generation component 122 provides a software component used to generate the clothing models 135. As described in greater detail below, each clothing model 135 provides a compact proxy model of garment behavior that captures key dynamic properties and interactions with the body of a character wearing the clothing, allowing an approximation of dynamic behavior to be computed at a real-time frame rate. Thus, the clothing model 135 for a particular garment may be used in lieu of physical simulation to efficiently produce realistic cloth animations for virtual characters.

In one embodiment, each clothing model 135 may be generated from analyzing a complex simulation of the behavior of a particular garment worn by a skinned character (i.e., a character having a body surface in addition to a conformational or skeletal structure). For example, in one embodiment, clothing simulator 124 may be configured to generate clothing/garment simulation data 133 from motion capture/character data 131. In such a case, a range of character motion (e.g., walking, running, turning, jumping, etc.) may be captured by recording sensor data worn by an individual while engaging in a specified set of motions.

Once the motion capture/character data 131 is obtained, the physical clothing simulator 124 may simulate the behavior of a given garment engaging in the motions, actions or movements captured by the motion capture data 131. Such a simulation may use high-resolution meshes to represent fine fabric detail, complex time-stepping methods and non-linear solvers to resolve collisions between the body-surface of the character and the garment, as well as use other, non-real-time simulation techniques. Further, such a simulation may be configured to model a specific set of characteristics associated with a particular garment, e.g., to model garment made from leather versus silk.

The resulting cloth/garment simulation data 133 may provide a high-dimensional model of garment behavior. In one embodiment, this high-dimensional representation may be used as a basis for generating a low-dimensional linear model of the same garment behavior used to animate frames at a real-time frame rate. Given the constrained topology of a particular piece of clothing and the way that pieces of clothing fit and move on the body, the motion of individual facets of the mesh representing the clothing are not independent. This implies that the number of underlying degrees of freedom in the clothing is much lower than the number of vertices in graphics geometry, and, therefore, is largely independent of the resolution. Hence, most of the variation in the geometric appearance of the clothing may be captured using relatively few degrees of freedom. In one embodiment, Principal Component Analysis (PCA) techniques may be used to generate linear, low dimensional representations of the cloth/garment and the character. The model generation component 122 may then use low-dimensional representations to generate a conditional, leaner cloth model used at runtime to model dynamic garment behavior (cloth model 135). That is, a conditional dynamical model of the cloth may be generated from the low-dimensional linear cloth space.

Figure 2:
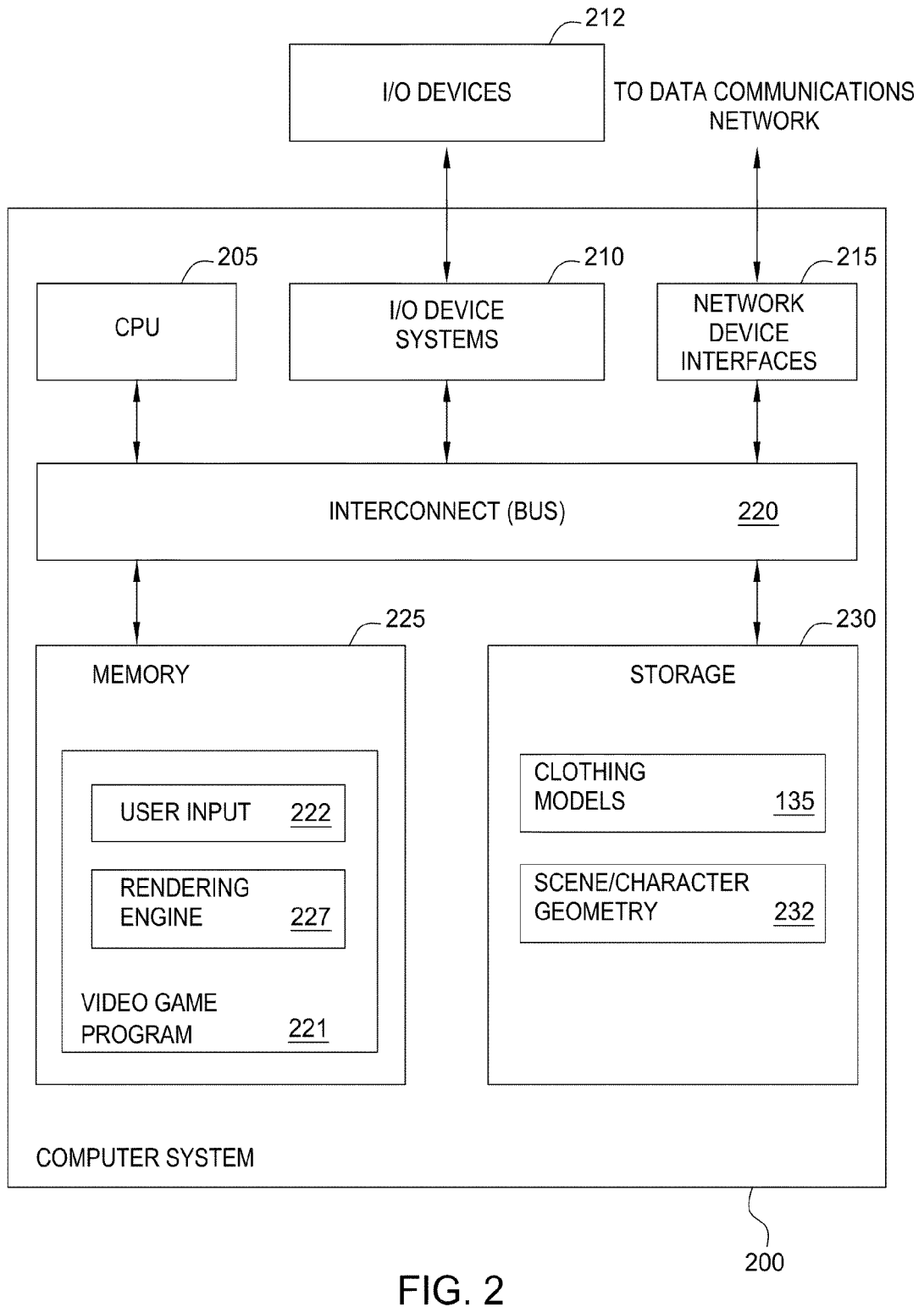
FIG. 2 illustrates an example of a computing system used to render a garment on a body using a learning-based cloth model, according to one embodiment of the invention.

FIG. 2 illustrates an example of a computing system used to render a garment on a body using a learning-based cloth model, according to one embodiment of the invention. As shown, computing system 200 includes, without limitation, a central processing unit (CPU) 205, a network interface 215, an interconnect 220, a memory 225, and storage 230. The computing system may also include an I/O device interface 210 connecting I/O devices 212 (e.g., keyboard, display, pointing devices, game controller devices, etc.) to the computing system 200.

Like CPU 105 of FIG. 1, CPU 2 is configured to retrieve and execute programming instructions stored in the memory 225 and storage 230. Similarly, the CPU 205 is configured to store and retrieve application data residing in the memory 225 and storage 230. The interconnect 220 is configured to move data, such as programming instructions and application data, between the CPU 205, I/O devices interface 210, storage unit 230, network interface 205, and memory 225. In this example, computing system 200 is representative of a desktop computing system. However embodiments of the invention may be adapted for use in a broad variety of computing devices, including, e.g., computer readable code stored on a video game cartridge or CD/DVD/Blu-ray® disc, a video game console, handheld devices such as a mobile telephone or tablet computing system, as well as other systems that require real-time simulation of clothing dynamics on characters, e.g., a large simulator or virtual world environments.

As shown, the memory 225 includes a video game program 221 and the storage 230 includes data used to render garments on the characters during the course of game-play. Accordingly, the video game program 221 itself includes user input 223 and a rendering engine 227. The user input 221 corresponds to commands issued, e.g., using a video game controller, to control the actions of a character. For example, a user could make a character run in a particular direction. Of course, the video game may also include non-player characters that respond or react to the actions of the character. The rendering engine 227 is configured to generate animation frames based on the scene/character geometry 232 (i.e., the position and pose of the characters in a given environments) and the clothing models 135 provide a model for the dynamic properties of the garments worn by the character as they move through the scene geometry. As described in greater detail below, the clothing models 135 used by the rendering engine 227 to create images of the characters (whether user controlled or non-player characters).

Generating a Conditional, Linear, Clothing Model

Figure 3:
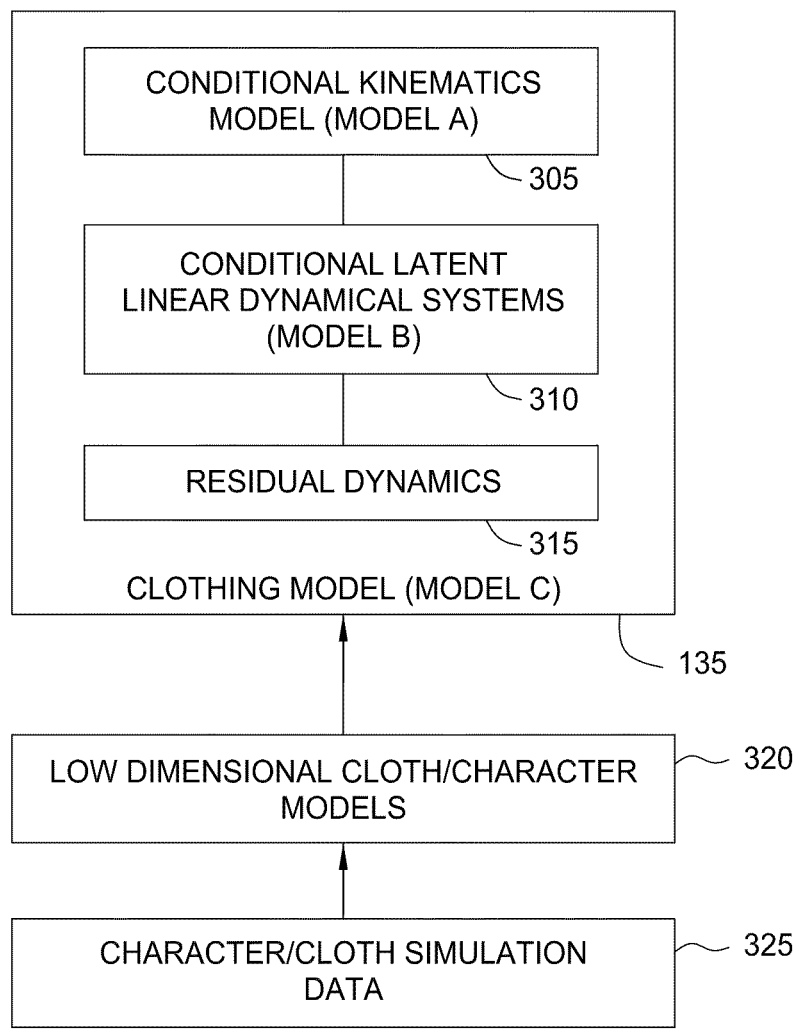
FIG. 3 illustrates an example of components of a learning-based cloth model, according to one embodiment of the invention.

As noted above, embodiments of the invention provide a learning-based approach to model the dynamic behavior of clothing. The conditional linear model is efficient, yet allows detailed clothing behaviors including folding to be rendered at a real-time frame rate. FIG. 3 illustrates an example of a learning-based cloth model, according to one embodiment of the invention.

As shown, the clothing model 135 is generated using character cloth/simulation data 324 and low-dimensional cloth/character models 320. In one embodiment, the dynamics of cloth is simulated on a skinned character animated by motion capture data, resulting in simulation data 325. Based on the simulation data, a low-dimensional representation for both the cloth and the outer surface of the body is generated by constructing two low-dimensional linear subspace models, one to represent the cloth and one to represent the surface of the character (i.e., models 320). The resulting low-dimensional models 320 encapsulate possible deformations of the cloth and the body, respectively, while accounting for fine detail such as cloth folds.

A conditional dynamical model of the cloth in the low-dimensional linear cloth space is then generated, based on the low-dimensional models 320. The learned conditional dynamical model (i.e., the clothing model 135) provides an efficient means of estimating the latent state of the cloth over time, based on the current latent state of the body, the history of past cloth states, and meta-parameters encoding the character's root motion in space. In one embodiment, principal component analysis (PCA) is used to generate the low dimensional cloth and character models 320. The parametric nature of PCA ensures that the representation is independent of the training set used to generate character/cloth simulation data 325. That is, the linear nature of the model directly translates to computational efficiency.

PCA may be applied to the vertices of a garment mesh directly. However, one practical issue is the choice of the space in which these meshes are represented. In one embodiment, the cloth (and the surface body) may be represented in a canonical space defined with respect to the skeleton of the underlying character. To do so, all cloth (and body) meshes are transformed into a canonical space by: (1) subtracting the global position of the root of the skeleton root, $p_t \in R^3$ and (2) orienting the meshes so that they are always facing in one direction (aligning the hips of the skeleton with the x-axis, by applying rotation along a vertical axis, $r_t \in R^1$).

More formally, the cloth mesh at time t, $m_t^{(c)} \in T^{3N_c}$, represented by a series of $N_c$ vertices$\in R^3$, can be encoded by coefficients, $y_t$, in the learned cloth PCA space spanned by $M_c$ linear bases:

$$m_t^{(c)} = R_z(r_t)[\Lambda^{(c)} y_t + \mu^{(c)}] + p_t$$

where $R_z(r)$ is a 3×3 rotation matrix that transforms the mesh from the canonical coordinate frame to the world, $\Lambda^{(c)} \in R^{3N_c \times M_c}$ are the learned bases obtained by singular value decomposition (SVD), and $\mu^{(c)}$ is the mean cloth computed over the entire simulated dataset.

Similarly, the outer surface of the body at time t, $m_t^{(b)} \in R^{3N_b}$ represented by a series of $N_b$ vertices, can be encoded by coefficients, $x_t$, in the learned body PCA space spanned by $M_b$ linear bases:

$$m_t^{(b)} = R_z(r_t)[\Lambda^{(b)} x_t + \mu^{(b)}] + p_t$$

where $\Lambda^{(b)} \in R^{3N_c \times M_b}$, and $\mu^{(b)}$ is the mean body computed over the dataset of skinned meshes in the canonical space.

Once the low-dimensional models 320 for the cloth are generated, the clothing model 135 may be generated. In general, the model 135 may be used to estimate the state, $y_t$, of this model over time such that the reconstructed high-dimensional cloth motion exhibits appropriate dynamics for a given motion of the body of the character. In general, the state of the cloth should be driven by two processes, (1) a conditional kinematic process that serves as control signal and (2) the internal dynamics of the cloth—(1) can be thought of as a steady-state appearance of the cloth once it settles on the body and (2) is the dynamic component that accounts, for example, for the residual swing of the cloth in a walk followed by an abrupt stop.

Illustratively, the clothing model includes a conditional kinematics model (model A) 305, a conditional latent linear dynamical systems model (model B) 310, and a residual dynamics model (model C) 315. Model A 305 is configured to account for motions of the cloth that do not exhibit a significant dynamic component (e.g., very slow motions with heavy fabric). The model A 305 is used to estimate a state of the cloth or garment worn by a character based on the pose of that character, without regard for prior states.

Model B 310 extends model A by introducing a latent linear dynamical system Model B 310 to model dynamic behavior of clothing/garments in dynamic scenarios. Finally, model B 310 is augmented with additional conditional dynamic terms that result from un-modeled global motion of the character in the world (encoded by meta-parameters). This last addition gives the final form of the clothing model 135, referred to herein as Model C.

In one embodiment, the conditional kinematic model (model A 305) can be formulated as a regression problem, where given a state of the body, $x_t$, a function is found, $y_t = f(x_t)$, that maps the $x_t$ state to the corresponding state of the cloth or garment (given by $y_t$). In one embodiment, a linear (parametric) regression model may be used to generate the conditional kinematic model and determine the function $y_t = f(x_t)$. Using a linear (parametric) regression may facilitate faster real-time performance and satisfy limited storage requirements (dictated by the limits of graphics hardware). Alternatively, low-dimensional non-linear models (e.g., variants of Shared GPLVM), or other regression models may be used.

Further, the resulting conditional model can be expressed compactly using a single matrix multiplication:

$$y_t = Af(x_t)$$

where $A \in R^{M_c \times M_b}$ is the matrix of learned regression coefficients obtained by minimizing a least-squares objective, and $M_c$ and $M_b$ are dimensions of the two latent spaces representing the cloth and the surface of the body, respectively.

Given the conditional model A 305 of the cloth, model B 310 is used to model residual dynamics that cannot be accounted for by the conditional kinematic model (i.e., model A 305). For example, consider a case of a woman abruptly stopping in mid-stride. While the pose and the surface of her body stops, her garment will continue to move for some time until settling. These are precisely the effects that the current skinned models cannot handle.

In one embodiment, stationary dynamics of the cloth in the latent space may be expressed using a $2^{nd}$ order linear dynamical system (LDS). Using a model of this form facilitates smoothness and continuity in the motion of the cloth and can account for the dynamic effects such as the one discussed above. More formally, a $2^{nd}$ order LDS assumes that the state of cloth at time t can be expressed as a linear combination of the states at time t−1 and t−2. The conditional kinematics can be interpreted, in this context, as a time-varying bias, resulting in:

$$y_t = Ax_t + B_1 y_{t-1} + B_2 y_{t-2}$$

where $B_i \in R^{M_c \times M_c}$ are matrices of coefficients to be learned. Note, one of ordinary skill in the art will recognize that this formulation can readily be extended to an $N^{th}$ order LDS. However, in practice a $2^{nd}$ order model has proven to perform well; with $0^{th}$ (i. model A 305) and $1^{st}$ order models providing inferior performance, and $3^{rd}$, $4^{th}$ and $5^{th}$ order models adding complexity without noticeably improving performance (and in some cases suffering from overfitting).

Additionally, Model A 305 and model B 310 model the cloth dynamics in a canonical space. However, some of the dynamics to the change in the global position and heading of the body are left un-modeled. Consider a person turning left or right, in such a case model B 310 provides a model of the forward swing of the dress, but is not be able to model the twist in the appropriate direction. This occurs because the representation of $2^{nd}$ order dynamics provided by model B 310 is normalized with respect to the heading of the body.

Figure 6A:
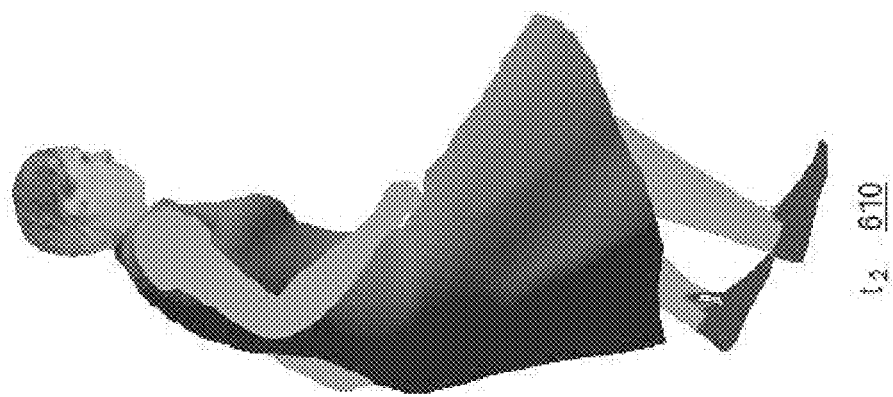
FIGS. 6A-6B illustrate an example of animation frames rendered using a skinning model and a learning-based cloth model, respectively, according to one embodiment of the invention.
Figure 6A:
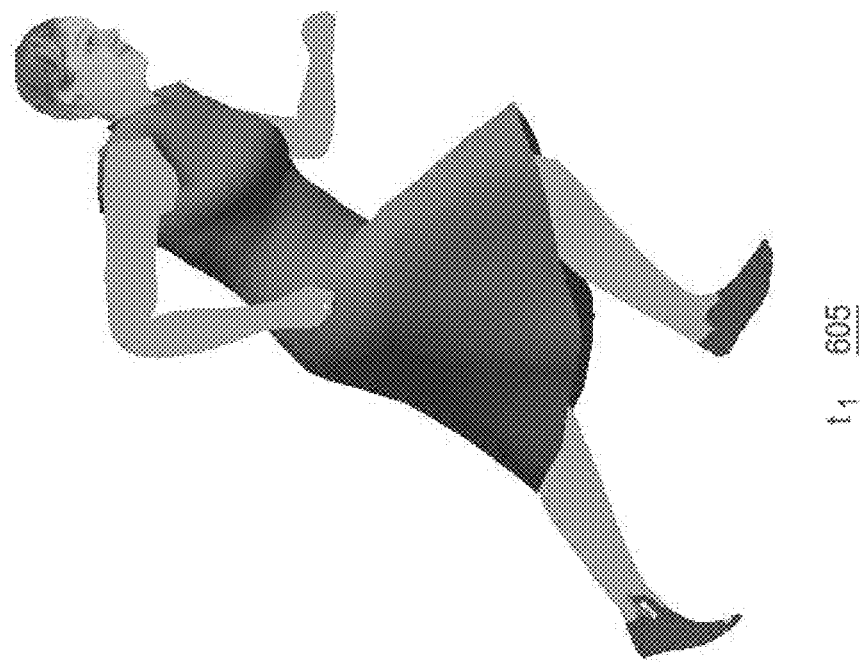
Figure 6B:
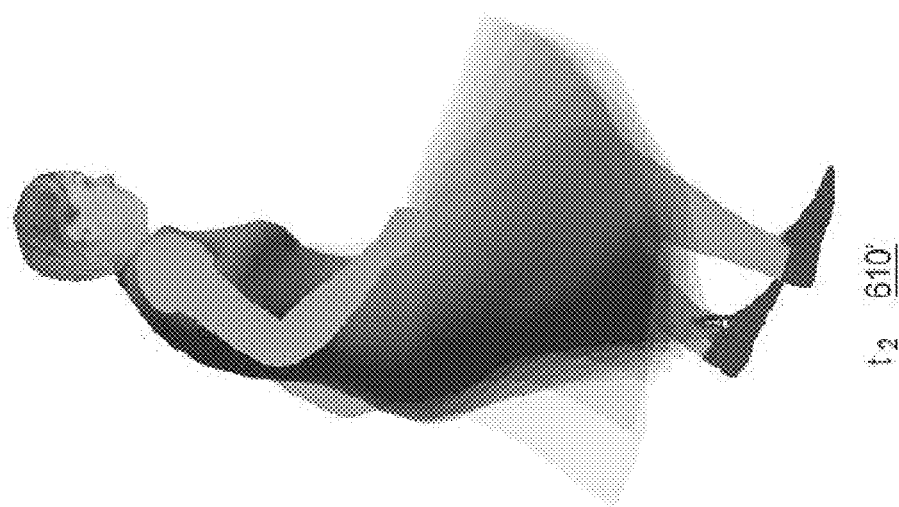
Figure 6B:
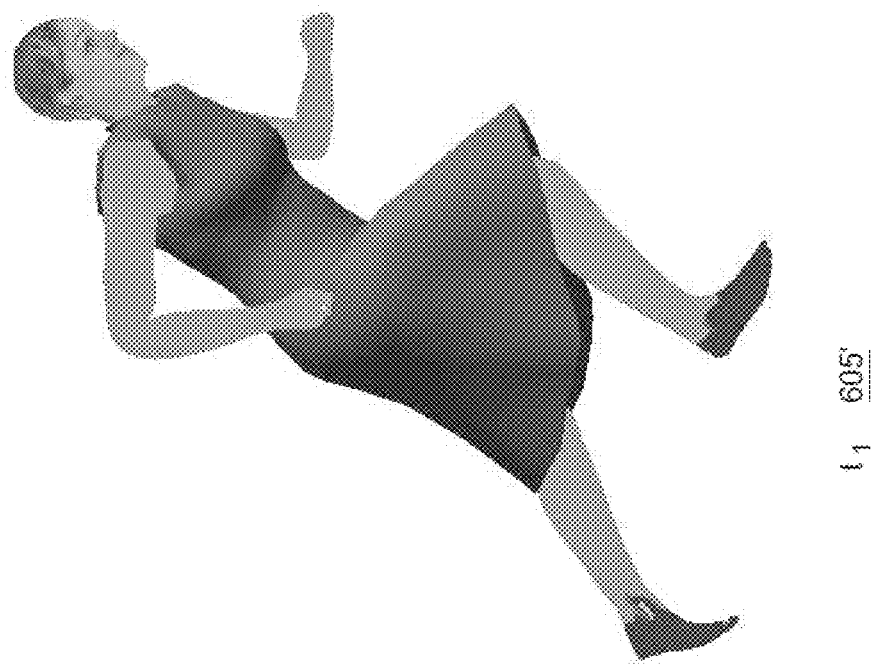

FIG. 6A shows another example, where a character is shown running at time 1 ($t_1$ 605) and coming to a stop at time 2 ($t_2$ 610). As the character stops, the dress swings forward, but then simply remains in that position. That is, the combination of model A 305 and model B 310 alone does not account for the residual dynamics. A simple conditional kinematics model is not able to account for the residual motion of the dress when the character abruptly stops. In contrast FIG. 6B shows the results of adding the residual dynamics, where the character 600 is shown running at time 1 ($t_1$ 605') and coming to a stop at time 2 ($t_2$ 610'). As the character stops, the dress swings forward, but unlike the result in FIG. 6A, the dress continues to swing forward, creating the realistic appearance of the garment.

In one embodiment, to account for this residual dynamics 315 are used to further condition the dynamics provided by model B 310 on the relative motion of the root (along the degrees of freedom that can not be accounted for in the canonical space). For the $2^{nd}$ order model, this may occur on the history over the past two frames. This change adds two conditional terms to the combination of model A 305 and model B 310, resulting in the final representation of the clothing model 135 (model C):

$$y_t = Ax_t + B_1 y_{t-1} + B_2 y_{t-2} - C_1 z_{t,t-2} + C_2 z_{t-1,t-2}$$

where $C_i \in R^{M_c \times 5}$ are matrices of coefficients to be learned, and $z_{t,j}$ are the meta parameters encoding the relative position and heading of the root at frame t with respect to time j. More formally, $z_{t,j}$ may be expressed as follows:

$$z_{t,j} = \begin{bmatrix} R_z(-r_j)\Delta p_t \\ \sin(\Delta r_t) \\ \cos(\Delta r_t) \end{bmatrix}$$

where $\Delta p_t = p_t - p_j$, $\Delta r_t = r_t - r_j$. Note that the representation of the cloth remains in the canonical space, but the dynamics are now conditioned on the meta-parameters (corresponding to the relative position and heading of the root).

Given the additive nature of the clothing model 135 (i.e., the additive nature of model A 305, model B 310, and the residual dynamics 315), the parameters $[A, B_1, B_2, C_1, C_2]^T$ may be learned simultaneously. The same is true for models with lower or higher order dynamics. Accordingly, in one embodiment, the clothing model 135 may be formulated by minimizing the squared error between the observed and predicted value for $y_t$ for a dataset D. The dataset D represents temporal sequences of movement in the character/cloth simulation data 325. For example, for temporal sequences of length 3, or length N for an $N^{th}$ order dynamical model). This may be represented formally as follows:

$$\min_{A, B_1, B_2, C_1, C_2} \sum_D \left\| y_t - \begin{bmatrix} A^T \\ B_1^T \\ B_2^T \\ C_1^T \\ C_2^T \end{bmatrix}^T \begin{pmatrix} X_t \\ y_{t-1} \\ y_{t-2} \\ z_{t,t-1} \\ z_{t-1,t-2} \end{pmatrix} \right\|_2^2$$

This formulation is a least-squares problem and can be solved by standard techniques.

Once the parameters of the clothing model 135 are learned, the state of the clothing or garment can be determined by conditioning on the latent parameterization of the body, previous cloth states, and the relative position and heading of the characters root. That is, by conditioning the parameters in the model equation given above of:

$$y_t = Ax_t + B_1 y_{t-1} + B_2 y_{t-2} + C_1 z_{t,t-2} + C_2 z_{t-1,t-2}$$

The predicted clothing state given by a given clothing model 135 in the canonical space can then transformed into the world space for visualization. In one embodiment, For initialization, a $0^{th}$ order model is used to bootstrap the process for the first two frames, at which point the process switches to the 2nd order model discussed above.

Figure 4:
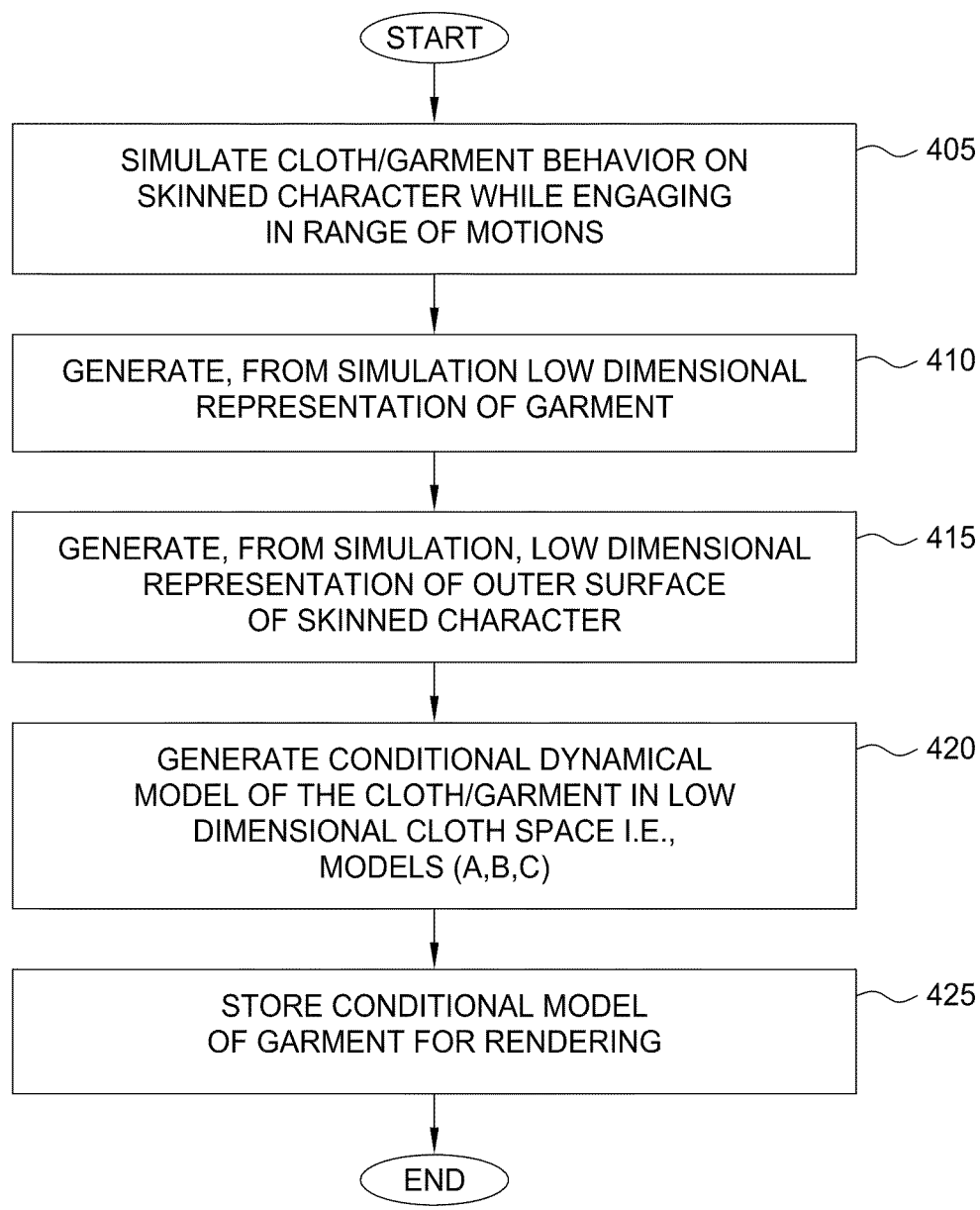
FIG. 4 illustrates a method for generating a learning based cloth model, according to one embodiment of the invention.

FIG. 4 illustrates a method 400 for generating a learning-based clothing model, according to one embodiment of the invention. As shown, the method 400 begins at step 405, where the behavior of a particular cloth or garment behavior is simulated on a skinned character engaging in a range of motions. For example, as noted above, a motion capture system may be used to record an actor while performing a desired set of choreography. For example, a person wearing the appropriate motion capture system could engage in a variety of atomic motion sequences, including, e.g., walking and running at different speeds, turns at 45°, 90°, 180°, and 360°, locomotion with stops, ducking, and jumping/leaping to avoid obstacles, as well as transitions between these motions. The particular choreography may be selected as appropriate to build a motion graph consistent with the control of a typical character in a game (or the specific actions of a character in a game during some planned movement of game play). More generally the range of motions corresponds to the motions that may need to be animated while a character (human or otherwise) navigates through a virtual environment while wearing a particular garment (or garments).

At step 410, a low-dimensional representation is generated from the simulation data generated at step 405. And at step 415, a low-dimensional representation of the outer surface of the skinned character is generated from the simulation data generated at step 405. As noted above, the low-dimensional representations generated at step 410 and 415 may be generated using PCA techniques to create a linear model of the character and the cloth or garment.

At step 415, the clothing model generation component may generate the conditional, dynamical model of the cloth/garment in the low-dimensional spaces obtained using the PCA analysis. That is, at step 415, the model generation component may generate the model C 135 from model A 305, model B and the residual dynamics 315, as discussed above. As noted, in one embodiment, the full model may be formulated as a least-squares problem and solved for using standard techniques.

At step 425, once created, the clothing model representing a particular garment may be stored for use in rendering the garment on a character at a real time frame rate (e.g., during the ongoing game play of a video game).

Figure 5:
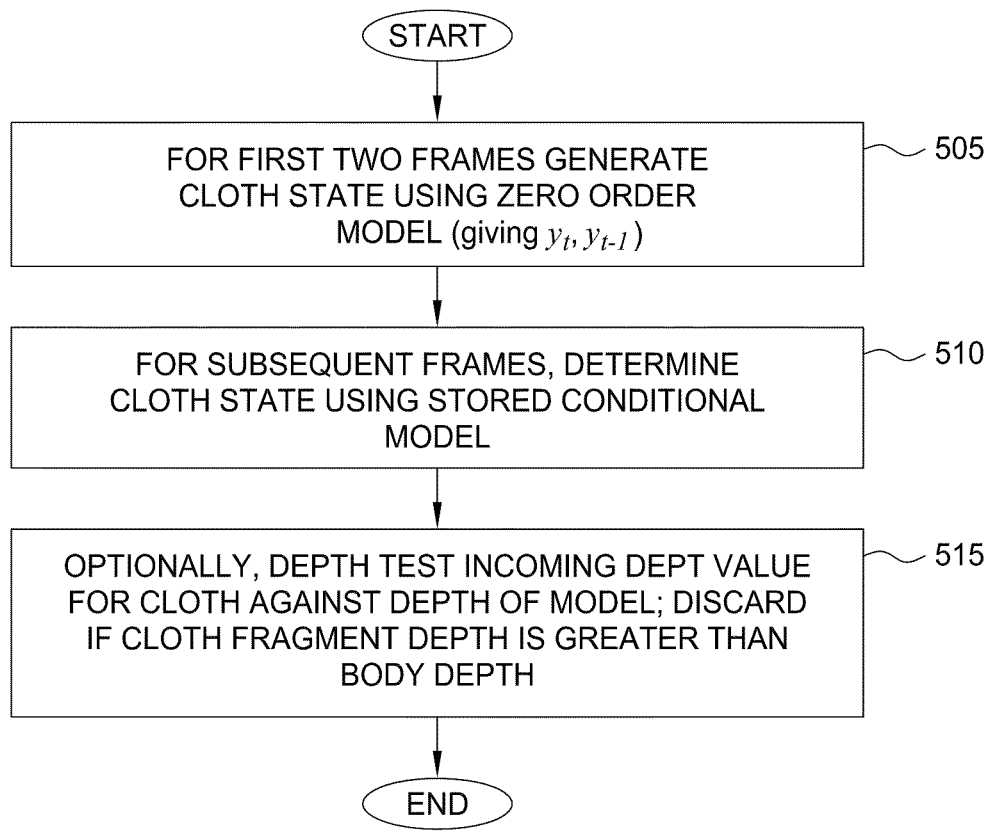
FIG. 5 illustrates a method for rendering a garment on a body using a learning-based cloth model, according to one embodiment of the invention.

For example, FIG. 5 illustrates a method 500 for rendering a garment on a body using a learning-based cloth model, according to one embodiment of the invention. As shown, the method 500 begins at step 505 where a rendering engine renders a first frame that includes a character wearing a garment modeled by a clothing model generated using the techniques discussed above. For the first and second frames, the relative position of garment and the body of the character is rendered using a $0^{th}$ order model. Doing so bootstraps the $2^{nd}$ order model for subsequent frames. At step 510, the rendering engine begins rendering a third frame (and subsequent frames) using the $2^{nd}$ order linear dynamics model.

Additionally, in one embodiment, the rendering engine may perform depth testing to ensure that the position of the clothing determined using the clothing model 305 does not result in clothing that penetrates the surface of the character wearing the garment (step 515). That is, the clothing model 135 is able to construct models that approximately maintain depth consistency. However, in some situations the cloth may penetrate the body (or vice-versa) for small periods of time due to abrupt changes in acceleration or severe articulations.

In one embodiment, the depth checking performed at step 515 includes two steps. First, regions of the human body will always be occluded by the garment are pre-computed. Doing so allows the rendering engine to easily discard fragments of the underlying human body (or other character) that are always occluded for each character-clothing pair. Second, to render each frame, the human model(s) (or other characters) are modeled first. After the underlying models are rendered, a depth map may be saved in a texture and used inside a fragment shader to compare the model's stored depth value $d_{body}$ to an incoming depth value for the cloth fragment $d_{cloth}$. Instead of simply discarding the fragment of the cloth if $d_{cloth} > d_{body}$, we use a small threshold $\epsilon_{depth}$ and discard the incoming cloth fragment only if $d_{cloth} + \epsilon_{depth} > d_{body}$. This approach enables the proper rendering of the resulting cloth animations, but also generalizes well to characters with multiple garments (e.g., a character wearing both a shirt and pants).

Advantageously, embodiments of the invention provide a learning-based clothing model that enables the simultaneous animation of multiple detailed garments in real-time. As described above, a simple conditional model learns and preserves key dynamic properties of cloth motions and folding details. Such a conditional model may be generated for each garment worn by a given character. Once generated, the conditional model may be used to determine complex body/cloth interactions in order to render the character and garment from frame-to-frame. More generally, the clothing model bridges the gap between a simple skinning model that does not account for the dynamical aspects of garment/character interaction and physical simulation, providing the benefits of speed from the former with the dynamic visual effects from the latter. The clothing model may be used for a variety of garments worn by male and female human characters (as well as non-human characters) while performing a varied set of motions typically used in video games (e.g., walking, running, jumping, turning, etc.).

Various embodiments of the invention may be implemented as a program product for use with a computer system. The program(s) of the product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A method for generating a cloth behavior model, comprising:
generating a first low-dimensional representation, wherein the first low-dimensional representation models a cloth in contact with an object;
generating a second low-dimensional representation, wherein the second low-dimensional representation models a surface of the object in a linear cloth space, wherein the surface contacts the cloth;
generating, as the cloth behavior model and on the basis of the first and second low-dimensional representations, a dynamical model of the cloth in the linear cloth space, wherein the cloth behavior model comprises:
a conditional kinematic model configured to represent motions of the cloth without a dynamic component,
a latent linear dynamical system model to model dynamic behavior of the cloth in contact with the object, and
a residual dynamics model; and
storing the resulting cloth behavior model for use in animating the cloth in contact with the object.

2. The method of claim 1, wherein the first and second low-dimensional representations encapsulate a set of latent deformations of the cloth and the object respectively.

3. The method of claim 1, wherein the object is a character and the cloth in contact with the object is a garment worn by the character.

4. The method of claim 3, further comprising:
generating a sequence of animation poses of the character wearing the garment, wherein the state of the garment relative to the character is determined in each frame according to the cloth behavior model.

5. The method of claim 4, further comprising:
computing regions of the character which are occluded by the garment; and while generating the sequence of animation poses, discarding one or more rendering fragments of the character that are occluded by the garment.

6. The method of claim 1, wherein the cloth behavior model is a linear dynamical system (LDS) model, and further comprising:
predicting a current state of the cloth by parameterizing the cloth behavior model on one or more previous states of the cloth and the relative position and heading of the object; and
based on the predicted state of the cloth, rendering an animation frame depicting the cloth in contact with the object.

7. The method of claim 1, wherein the first and second low-dimensional representations are generated using principal component analysis.

8. The method of claim 1, wherein the object is a character and the cloth in contact with the object is a garment worn by the character, and wherein the first and second low-dimensional representations are generated from motion capture data representing a choreography of motions to be performed by the character.

9. A non-transitory computer-readable storage medium storing instructions that, when executed by a processor, cause a computer system to perform an operation for generating a cloth behavior model, the operation comprising:
generating a first low-dimensional representation modeling a cloth in contact with an object;
generating a second low-dimensional representation, wherein the second low-dimensional representation models a surface of the object in a linear cloth space, wherein the surface contacts the cloth;
generating, as the cloth behavior model and on the basis of the first and second low-dimensional representations, a dynamical model of the cloth in the linear cloth space, wherein the cloth behavior model comprises:
a conditional kinematic model configured to represent motions of the cloth without a dynamic component,
a latent linear dynamical system model to model dynamic behavior of the cloth in contact with the object, and
a residual dynamics model; and
storing the resulting cloth behavior model for use in animating the cloth in contact with the object.

10. The non-transitory computer-readable storage medium of claim 9, wherein the first and second low-dimensional representations encapsulate a set of latent deformations of the cloth and the object respectively.

11. The non-transitory computer-readable storage medium of claim 9, wherein the object is a character and the cloth in contact with the object is a garment worn by the character.

12. The non-transitory computer-readable storage medium of claim 11, wherein the operation further comprises:
generating a sequence of animation poses of the character wearing the garment, wherein the state of the garment relative to the character is determined in each frame according to the cloth behavior model.

13. The non-transitory computer-readable storage medium of claim 12, wherein the operation further comprises:
computing regions of the character which are occluded by the garment; and while generating the sequence of animation poses, discarding one or more rendering fragments of the character that are occluded by the garment.

14. The non-transitory computer-readable storage medium of claim 9, wherein the cloth behavior model is a linear dynamical system (LDS) model, and wherein the operation further comprises:
predicting a current state of the cloth by parameterizing the cloth behavior model on one or more previous states of the cloth and the relative position and heading of the object; and
based on the predicted state of the cloth, rendering an animation frame depicting the cloth in contact with the object.

15. The non-transitory computer-readable storage medium of claim 9, wherein the first and second low-dimensional representations are generated using principal component analysis.

16. The non-transitory computer-readable storage medium of claim 9, wherein the object is a character and the cloth in contact with the object is a garment worn by the character and wherein the first and second low-dimensional representations are generated from motion capture data representing a choreography of motions to be performed by the character.

17. A system, comprising:
a processor; and a memory configured to perform an operation for generating a clothing model, the operation comprising:
  generating a first low-dimensional representation modeling a cloth in contact with an object;
  generating a second low-dimensional representation, wherein the second low-dimensional representation models a surface of the object in a linear cloth space, wherein the surface contacts the cloth;
  generating, as the cloth behavior model and on the basis of the first and second low-dimensional representations, a dynamical model of the cloth in the linear cloth space, wherein the cloth behavior model comprises:
    a conditional kinematic model configured to represent motions of the cloth without a dynamic component,
    a latent linear dynamical system model to model dynamic behavior of the cloth in contact with the object, and
    a residual dynamics model; and
  storing the resulting cloth behavior model for use in animating the cloth in contact with the object.

18. The system of claim 17, wherein the first and second low-dimensional representations encapsulate a set of latent deformations of the cloth and the object respectively.

19. The system of claim 17, wherein the object is a character and the cloth in contact with the object is a garment worn by the character.

20. The system of claim 19, wherein the cloth behavior model is used to generate a sequence of animation poses of the character wearing the garment, wherein the state of the garment relative to the character is determined in each pose according to the cloth behavior model.

21. The system of claim 20, wherein the cloth behavior model is further used to compute regions of the character occluded by the garment; and when used to generate the sequence of animation poses, discard one or more rendering fragments of the character that are occluded by the garment.

22. The system of claim 17, wherein the cloth behavior model is a linear dynamical system (LDS) model, and wherein the operation further comprises:
  predicting a current state of the cloth by parameterizing the cloth behavior model on one or more previous states of the cloth and the relative position and heading of the object; and
  based on the predicted state of the cloth, rendering an animation frame depicting the cloth in contact with the object.

23. The system of claim 17, wherein the first and second low-dimensional representations are generated using principal component analysis.

24. The system of claim 17, wherein the object is a character and the cloth in contact with the object is a garment worn by the character and wherein the first and second low-dimensional representations are generated from motion capture data representing a choreography of motions to be performed by the character.

* * * * *

UNITED STATES PATENT AND TRADEMARK OFFICE
CERTIFICATE OF CORRECTION

PATENT NO. : 9,704,288 B2
APPLICATION NO. : 12/974293
DATED : July 11, 2017
INVENTOR(S) : Edilson de Aguiar et al.

It is certified that error appears in the above-identified patent and that said Letters Patent is hereby corrected as shown below:

On the Title Page

On the page 2, in Column 1, under "Other Publications", Line 14, delete "Wordier," and insert -- Cordier, --, therefor.

On the page 2, in Column 1, under "Other Publications", Line 17, delete "Wordier," and insert -- Cordier, --, therefor.

On the page 2, in Column 1, under "Other Publications", Line 23, delete "Shahramani," and insert -- Ghahramani, --, therefor.

On the page 2, in Column 1, under "Other Publications", Line 25, delete "Soldenthal," and insert -- Goldenthal, --, therefor.

On the page 2, in Column 1, under "Other Publications", Line 45, delete "Jourmal" and insert -- Journal --, therefor.

On the page 2, in Column 2, under "Other Publications", Line 28, delete "Belle," and insert -- Selle, --, therefor.

On the page 2, in Column 2, under "Other Publications", Line 36, delete "lynamical" and insert -- dynamical --, therefor.

On the page 2, in Column 2, under "Other Publications", Line 42, delete "limensionality" and insert -- dimensionality --, therefor.

Signed and Sealed this
Fifth Day of September, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,704,288 B2

In the Specification

In Column 6, Line 28, delete "ϵT3Nc," and insert -- ϵR3Nc, --, therefor.